C. C. BURR.
PUZZLE.
APPLICATION FILED MAY 23, 1906.

899,949.

Patented Sept. 29, 1908.

WITNESS:

INVENTOR
Colin Clark Burr

UNITED STATES PATENT OFFICE.

COLIN CLARK BURR, OF JERSEY CITY, NEW JERSEY.

PUZZLE.

No. 899,949.          Specification of Letters Patent.          Patented Sept. 29, 1908.

Application filed May 23, 1906. Serial No. 318,368.

*To all whom it may concern:*

Be it known that I, COLIN CLARK BURR, a citizen of the United States, and resident of Jersey City, in the county of Hudson and State of New Jersey, have invented certain new and useful Improvements in Puzzles, of which the following is a specification.

This invention relates to certain new and useful improvements in puzzles, and it consists substantially in such features of construction as will hereinafter be more particularly described.

Figure 1:
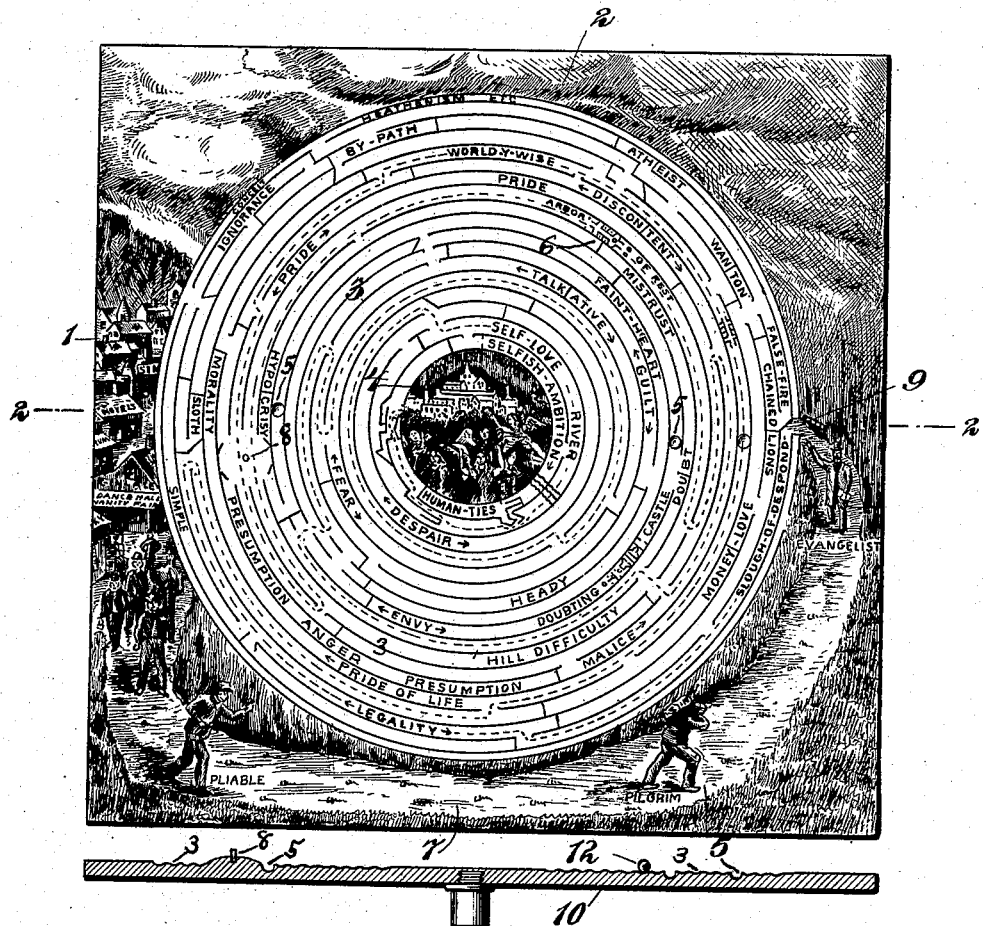
Figure 2:
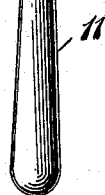

Figure 1, is a plan view of the puzzle. Fig. 2 is a sectional view thereof on the line 2 2 of Fig. 1.

The object of the invention is to provide a puzzle religious in its conception. The characters, scenes, paths and names represented in imitation and employed in the make up of the puzzle are supposed to represent the various experiences of a Christian after leading a sinful life to follow a righteous one, or the journey of a pilgrim fleeing from the city of destruction or sin represented by a pictorial view to the Eternal City standing in the center of a series of labyrinthian passages representing the conditions above referred to. In the midst of the various passages a true path is found leading into the Eternal City.

This invention belongs to that class of puzzles in which a marble, shot or an equivalent is caused to travel in grooves and in which the marble, shot, or equivalent is liable to get out of the right course as the board is turned or tilted from side to side instead of continuing in right paths. It consists of a suitable board or base upon which or in which are made a series of grooves more or less circular, some of which extend around the board, and owing to the devious nature of the one correct path for the ball to follow, and the number of misleading passages it is a matter of considerable difficulty to find the proper course for the ball. It will be noted also that the pilgrim represented by the marble enters into first one, and then another of the grooved passages, seeking as much as possible to avoid the conditions hereafter named (which journey can be traced by dotted lines shown in the drawings as the right path) but notwithstanding his efforts he finds himself going into a path detrimental to the life of a Christian, and he immediately seeks to extricate himself only to step into another equally as detrimental, and so on until he works out or through them all to arrive into the Eternal City.

In the drawings the numeral 1 represents the city of sin or city of destruction in a pictorial form as aforesaid.

10 represents the board or base which may be of suitable dimensions and preferably square and can be constructed of wood or cardboard or may be made of sheet metal, channels or runways for balls or other movable objects employed are formed by grooving the base as shown by the numeral 3.

7 represents the pathway in a pictorial form leading from the city of sin to the entrance gate of the channels or runways representing the Christian life, and designated by the numeral 9.

Upon the sides or bottom of the grooved passages 3 a name is printed representing some condition as mentioned above. The names in detail may be as follows,—heady, fear, envy, pride, malice, money-love, presumption, doubt, hypocrisy, sloth, anger, atheist, wanton, conceit, falsifier, ignorance, guilt and like names pertaining to a Christian experience.

12 represents the pilgrim or Christian, the same may be in the form of a ball, marble or any other movable body that can be employed.

5 represents pitfalls, pockets, or depressions from which the pilgrim can be dislodged only by the base being tilted to a steep angle which will impart to the pilgrim an impetus which will carry him far out the desired path unless the base is deftly manipulated.

8 represents a raised portion of the base of the puzzle which stands for a mountain, built to further retard the advancement of the pilgrim, increasing or adding to the tendency of the ball to depart from the desired path and enter side passages.

6 represents a place of rest for the pilgrim and named the arbor of rest.

The numeral 4 represents the Eternal City or the destination of the pilgrim and into which leads the true path sought out by the traveler throughout the game.

11 represents the handle which may sometimes be employed to tilt or turn the base, and the same may be constructed in any preferred form or shape, and connected as illustrated in the drawings or otherwise.

Having thus described my invention what I claim and desire to secure by Letters Patent, is—

1. In combination with a tiltable base having a starting point thereon for a ball, a pathway leading from said starting point, a series of circularly arranged channels or runways having designations thereon and having a passage leading from the pathway into the outer of said channels or runways, depressions upon the base in the path of the ball upon the runways, and a handle attached to the base for tilting the same, substantially as specified.

2. In combination with a tiltable base having a starting point thereon for a ball, a pathway leading from said starting point, a series of circularly arranged channels or runways having designations thereon and having a passage leading from the pathway into the outer of said channels or runways, depressions and protuberances upon the base in the path of the ball upon the runways, and a handle attached to the base for tilting the same, substantially as specified.

Signed at Jersey City in the county of Hudson and State of New Jersey this fourth day of May A. D. 1906.

COLIN CLARK BURR.

Witnesses:
 W. C. MILES,
 GEORGE W. JENKINS.